United States Patent [19]

Torii et al.

[11] Patent Number: 5,439,565
[45] Date of Patent: Aug. 8, 1995

[54] METHOD OF MANUFACTURING ELECTRODE FOIL FOR ALUMINIUM ELECTROLYTIC CAPACITORS

[75] Inventors: Takeshi Torii, Kyoto; Katsunori Suzuki, Yawata; Tetsuo Sonoda, Joyo; Kouichi Kojima, Hirakata, all of Japan

[73] Assignee: Matsushita Electric Industrial Co., Ltd., Osaka, Japan

[21] Appl. No.: 212,575

[22] Filed: Mar. 16, 1994

[30] Foreign Application Priority Data

Mar. 19, 1993 [JP] Japan .................. 5-059942

[51] Int. Cl.$^6$ ................................. C25F 3/04
[52] U.S. Cl. ...................... 204/129.1; 204/129.75; 204/129.95
[58] Field of Search ............ 204/129.75, 129.95, 204/129.1

[56] References Cited

U.S. PATENT DOCUMENTS

| | | | |
|---|---|---|---|
| 4,276,129 | 6/1981 | Kanzaki et al. | 204/129.75 X |
| 4,547,275 | 10/1985 | Ejima et al. | 204/129.75 |
| 5,186,795 | 2/1993 | Hall | 204/129.75 X |

FOREIGN PATENT DOCUMENTS

| | | |
|---|---|---|
| 2559164A1 | 8/1985 | France . |
| 2303018A | 12/1990 | Japan . |
| 3101213A | 4/1991 | Japan . |
| 3136226A | 6/1991 | Japan . |

OTHER PUBLICATIONS

Patent Abstracts of Japan, vol. 15, No. 304 (E-1096) 5 Aug. 1991 & JP-A-03 108 710 (ELNA CO LTD) 8 May 1991.
Patent Abstracts of Japan, vol. 14, No. 244 (E-0932) 24 May 1990 & JP-A-02 066 925 (Matsushita Electric Ind Co) 7 Mar. 1990.

*Primary Examiner*—Donald R. Valentine
*Attorney, Agent, or Firm*—Stevens, Davis, Miller & Mosher

[57] ABSTRACT

For this invention it is disclosed that aluminium electrode foil is caused to pass through any of nitric acid, sulfuric acid and mixed acid thereof each added with at least one selected from the group consisting of chromic acid, oxalic acid, citric acid, phosphoric acid, boric acid, succinic acid and malonic acid as an additive and electrically etched in the etching process of a final stage for increasing the diameter of pits created in a preceding stage for etching to a diameter suitable for a forming voltage, and any of the nitric acid, sulfuric acid and mixed acid thereof controls the concentration of dissolved aluminium to 5 to 25 g/l, whereby aluminium is dissolved along the inner wall of the pits while the surface dissolution of the aluminium electrode foil is suppressed, so that the diameter of the pits can be effectively increased.

31 Claims, No Drawings

METHOD OF MANUFACTURING ELECTRODE FOIL FOR ALUMINIUM ELECTROLYTIC CAPACITORS

BACKGROUND OF THE INVENTION

1. Field of the Invention

The present invention relates to a method of manufacturing electrode foil for aluminium electrolytic capacitors, and more specifically, to an etching technology for anode aluminium foil used for medium and high voltage capacitors.

2. Description of the Related Art

Recently, as electronic appliance sets are miniaturized and their reliability are increased, the requirements for miniaturization and reduced costs of users for aluminium electrolytic capacitors are rapidly increasing. Thus, a capacitance per unit area of electrode foil for aluminium electrolytic capacitors (hereinafter, referred to as electrode foil) must be increased as compared with conventional ones.

A conventional method of manufacturing electrode foil will be described below.

Electrode foil is composed of aluminium foil whose effective surface area is increased by electrochemically or chemically etching the aluminium foil for miniaturizing capacitors. Although various etching methods have been examined for increasing the surface area, it is generally achieved in such a manner that the aluminium foil is continuously put into several kinds of different etching baths and applied with a current or chemically dissolved in the respective baths to gradually increase the surface area of the aluminium foil and then finally washed. Especially, in case of the electrode foil used for medium and high voltage capacitors, etched pits (hereinafter, referred to as pits) formed in a preceding stage must be increased to a diameter suitable for a voltage in use in a succeeding stage and how to effectively increase pit diameters is an important consideration.

Conventionally, pits are produced by electric etching in an acid solution containing chlorine ions in the preceding stage and the diameter of the pits is increased by chemical dissolution in an acid solution of high temperature in the succeeding stage. This method which relies on the chemical dissolution in the succeeding stage is liable to be affected by a difference (dispersion) of the dissolving property among the lots of raw foil and the diameter of pits cannot be uniformly increased. Thus, it is difficult to increase a capacitance of the electrode foil. With respect to this point, as disclosed in Japanese Patent Unexamined Publication No. Hei 2-303018, Japanese Patent Unexamined Publication No. Hei 3-101213 and Japanese Patent Unexamined Publication No. Hei 3-136226, a technology for carrying out electrical etching process by use of an aqueous solution of nitric acid in the succeeding stage is known.

Nevertheless, the above known technology is not satisfactory in the point that the diameter of pits is effectively increased while an amount of dissolved aluminium is controlled because there is an insufficient point with respect to the constitution and liquid temperature of the aqueous solution of nitric acid.

SUMMARY OF THE INVENTION

An object of the present invention for solving the conventional problem is to provide a method of manufacturing electrode foil for aluminium electrolytic capacitors capable of making electrode foil having a high capacitance per unit area.

DESCRIPTION OF THE PREFERRED EMBODIMENT

An embodiment of the present invention will be described below.

Aluminium raw foil having purity of 99.98% and a thickness of 100 μm was subjected to an etching process in a preceding stage by being dipped into an aqueous solution of acid (constitution: hydrochloric acid; 10%, sulfuric acid; 10%) having a temperature of 85° C. and applied with a direct current having a current density of 20A/dm$^2$ for 200 seconds, and then the thus obtained aluminium electrode foil was subjected to an etching process in a succeeding stage or a final stage by being dipped into an etching solution having a constitution shown in Table 1 and applied with a direct current having a current density of 10A/dm$^2$ for 600 seconds.

Here, as apparent from Table 1 below, although a concentration of dissolved aluminium was changed from 0 to 30 g/l, the concentration thereof of 15 g/l was the same level as the normal concentration (1.6N) of nitric acid.

Comparative Example

An etching process carried out in the preceding stage was the same as that used in the respective examples of the present invention and an etching process carried out in the succeeding stage or the final stage was carried out in an aqueous solution of nitric acid having a liquid temperature of 60° C., concentration of 10%, and concentration of an additive of 0.3% with the application of a direct current having a current density of 10A/dm$^2$ for 600 seconds.

The etched foils of the comparative example and the respective examples of the present invention were subjected to the forming treatment in an aqueous solution of boric acid of 8% having a temperature of 90° C. with a voltage of 600V applied thereto. Table 1 (mentioned later) shows the results of measurement of a capacitance and bending strength (one reciprocating bending operation effected under the conditions of 1.0 mmR, 50 g load, and bending angle of 90° was counted as one bending time) of the thus obtained respective specimens.

Although Table 1 below shows characteristics of the electrode foils resulting from a different concentration of dissolved aluminium in the etching solution in the succeeding stage or the final stage, the capacitance can be increased by controlling the concentration of dissolved aluminium to 5 to 25 g/l. When the concentration of the dissolved aluminium is low, the solution has a low PH, by which the surface dissolution of the aluminium electrode foil is accelerated, and thus a pit diameter cannot be effectively increased and the capacitance cannot be increased, whereas when the concentration of the dissolved aluminium is excessively high, the current is difficult to flow due to the increase of a liquid resistance and the deposition of aluminium to a cathode plate, and thus the pit diameter is difficult to be increased and the capacitance is lowered.

TABLE 1

| | Etching Conditions of Final Stage | | | | | | |
|---|---|---|---|---|---|---|---|
| | Liquid Crystal (°C.) | Concentration of Nitric Acid (%) | Concentration of Dissolved Aluminium (g/l) | Concentration of Added Oxalic Acid (%) | 600 Vf capacitance ($\mu$F/10 cm$^3$) | Bending Strength (Times) | Judgement |
| Comparative Example | 60 | 10 | 0 | 0.3 | 3.68 | 4 | |
| Example 1 | 60 | 10 | 2 | 0.3 | 3.71 | 5 | △ |
| Example 2 | 60 | 10 | 5 | 0.3 | 3.99 | 3 | ○ |
| Example 3 | 60 | 10 | 10 | 0.3 | 4.12 | 2 | ⊙ |
| Example 4 | 60 | 10 | 15 | 0.3 | 4.09 | 2 | ⊙ |
| Example 5 | 60 | 10 | 20 | 0.3 | 3.94 | 2 | ○ |
| Example 6 | 60 | 10 | 25 | 0.3 | 3.82 | 4 | ○ |
| Example 7 | 60 | 10 | 30 | 0.3 | 3.48 | 8 | × |
| Example 8 | 60 | 10 | 10 | 0 | 3.70 | 4 | △ |
| Example 9 | 60 | 10 | 10 | 0.1 | 3.91 | 3 | ○ |
| Example 10 | 60 | 10 | 10 | 0.2 | 4.11 | 2 | ⊙ |
| Example 11 | 60 | 10 | 10 | 0.3 | 4.14 | 3 | ⊙ |
| Example 12 | 60 | 10 | 10 | 0.4 | 4.07 | 2 | ⊙ |
| Example 13 | 60 | 10 | 10 | 0.6 | 3.92 | 2 | ○ |
| Example 14 | 60 | 10 | 10 | 0.8 | 3.88 | 2 | ○ |
| Example 15 | 60 | 10 | 10 | 1.0 | 3.61 | 1 | × |
| Example 16 | 60 | 2 | 10 | 0.3 | 3.98 | 3 | ○ |
| Example 17 | 60 | 5 | 10 | 0.3 | 4.12 | 2 | ⊙ |
| Example 18 | 60 | 8 | 10 | 0.3 | 4.00 | 4 | ⊙ |
| Example 19 | 60 | 15 | 10 | 0.3 | 3.91 | 2 | ○ |
| Example 20 | 60 | 20 | 10 | 0.3 | 3.55 | 7 | × |
| Example 21 | 40 | 10 | 10 | 0.3 | 3.18 | 8 | × |
| Example 22 | 45 | 10 | 10 | 0.3 | 3.67 | 2 | × |
| Example 23 | 50 | 10 | 10 | 0.3 | 3.86 | 2 | ○ |
| Example 24 | 70 | 10 | 10 | 0.3 | 4.13 | 3 | ⊙ |
| Example 25 | 80 | 10 | 10 | 0.3 | 3.93 | 2 | ○ |
| Example 26 | 90 | 10 | 10 | 0.3 | 3.59 | 5 | × |

Further, although the effect of increase of the capacitance can be further enhanced by the addition of an additive such as oxalic acid etc, when the concentration of the additive exceeds 0.8%, the pit diameter cannot be increased and the capacitance is lowered, as shown in Table 1. This is assumed to be caused by that a film is formed on a foil surface by the additive added excessively during the etching in the succeeding stage or the final stage and the increase of the pit diameter is disturbed thereby. Therefore, the concentration of the additive is preferably 0.1 to 0.8% and more preferably 0.2 to 0.4%. Further, when the concentration of acid in the etching carried out in the final stage exceeds 15%, the etching solution has an increased oxidizing force and accelerates the dissolution of the foil surface, and a desired capacitance cannot be achieved. Therefore, the acid used in the etching solution in the succeeding stage or the final stage is preferably as diluted as possible. When the acid is too diluted, however, since the liquid has an increased resistance, a rectifier and power source capable of complying with an increase of power consumption in the etching process must be provided. Therefore, the acid concentration is preferably 2 to 15% and more preferably 5 to 10%.

Further, as apparent from Table 1, when the etching solution in the final stage has a temperature lower than 50° C., the solution has a weak activity and the pit diameter cannot be increased, whereas when the solution has a temperature exceeding 80° C., a ratio of chemical dissolution is increased and the amount of dissolving aluminium cannot be electrochemically controlled. Therefore, the temperature range is preferable 50° to 80° C. and more preferably 60° to 70° C.

The ratio of an amount of electric etching in the final stage to a total amount of dissolution by etching in the examples of the present invention and the comparative example is 50%. When a forming treatment is carried out with medium and high voltages (200 to 650V), however, this ratio is preferably controlled to 20 to 60%. When the ratio is not greater than 20%, the pit diameter cannot be sufficiently increased and the number of ineffective pits which are filled with the chemically created forming film (which does not contribute to an increase of the capacitance) is increased, whereas when the ratio is not less than 60%, adjacent pits merge with one another and the capacitance is lowered on the contrary.

As described above, the capacitance could be increased by about 10% as compared with the conventional method by adding the additive to the solution used in the electric etching in the final stage and further dissolving the aluminium in a predetermined amount, that is, by controlling the concentration of the dissolved aluminium to 5 to 25 g/l.

Note, although the respective examples of the present invention show data in which nitric acid is used for the etching solution in the final stage and oxalic acid is used as the additive, even if sulfuric acid or mixed acid of nitric acid and sulfuric acid is added to the etching solution in place of the nitric acid, substantially the same results as those of the respective examples of the present invention can be obtained. On the other hand, even if any of chromic acid, phosphoric acid, citric acid, boric acid, succinic acid and malonic acid is added in place of the oxalic acid, substantially the same results as those of the respective examples of the present invention can be obtained.

As described above, according to the method of manufacturing an electrode foil for aluminium electrolytic capacitors of the present invention, an aluminium electrode foil is caused to pass through any of nitric acid, sulfuric acid and a mixed acid thereof each added with at least one selected from the group consisting of chromic acid, oxalic acid, citric acid, phosphoric acid, boric acid, succinic acid and malonic acid as an additive and electrically etched in the etching process of the final stage for increasing the diameter of pits created in the preceding stage for etching to a diameter suitable for a forming voltage, and any of the nitric acid, sulfuric acid and a mixed acid thereof controls the concentration of the dissolved aluminium to 5 to 25 g/l. Since the nitric acid, sulfuric acid and a mixed acid thereof contain the additive having a surface dissolution suppressing effect and dissolved aluminium ions, the etching solution has the pH near to a neutral level and further the aluminium ions dissolved in the acid improve the wettability of the aluminium electrode foil with the etching solution. Consequently, since the aluminium is dissolved along the inner wall of the pits, while the surface dissolution of the aluminium electrode foil is suppressed, the diameter of the pits can be effectively increased, and as a result a capacitance can be increased by a surface area increasing effect, which can contribute to the miniaturization and decreased costs of aluminium electrolytic capacitors.

What is claimed is:

1. A method of manufacturing electrode foil for aluminium electrolytic capacitors made by carrying out an etching process divided into at least two stages, comprising the steps of:

electrically etching aluminium electrode foil passing through any of nitric acid, sulfuric acid and a mixed acid thereof each added with at least one selected from the group consisting of chromic acid, oxalic acid, citric acid, phosphoric acid, boric acid, succinic acid and malonic acid as an additive in an etching process of a final stage for increasing the diameter of pits created in a preceding stage to a diameter suitable for a formation voltage; and in the electrical etching, controlling the concentration of dissolved aluminium to 5 to 25 g/l by any of said nitric acid, said sulfuric acid and said mixed acid thereof.

2. A method of manufacturing electrode foil for aluminium electrolytic capacitors according to claim 1, wherein an added concentration of said additive is 0.1 to 0.8%.

3. A method of manufacturing electrode foil for aluminium electrolytic capacitors according to claim 2, wherein said nitric acid or said sulfuric acid has a concentration of 2 to 15%.

4. A method of manufacturing electrode foil for aluminium electrolytic capacitors according to claim 3, wherein said nitric acid or said sulfuric acid has a liquid temperature of 50° to 80° C.

5. A method of manufacturing electrode foil for aluminium electrolytic capacitors according to claim 4, wherein an amount of electric etching in said nitric acid or said sulfuric acid is 20% to 60% of a total amount of dissolution by etching.

6. A method of manufacturing electrode foil for aluminium electrolytic capacitors according to claim 4, wherein said nitric acid or said sulfuric acid has a liquid temperature of 60° to 70° C.

7. A method of manufacturing electrode foil for aluminium electrolytic capacitors according to claim 6, wherein an amount of electric etching in said nitric acid or said sulfuric acid is 20 to 60% of a total amount of dissolution by etching.

8. A method of manufacturing electrode foil for aluminium electrolytic capacitors according to claim 3, wherein an amount of electric etching in said nitric acid or said sulfuric acid is 20% to 60% of a total amount of dissolution by etching.

9. A method of manufacturing electrode foil for aluminium electrolytic capacitors according to claim 3, wherein an amount of electric etching in said nitric acid or said sulfuric acid is 20% to 60% of a total amount of dissolution by etching.

10. A method of manufacturing electrode foil for aluminium electrolytic capacitors according to claim 3, wherein said nitric acid or said sulfuric acid has a concentration of 5 to 10%.

11. A method of manufacturing electrode foil for aluminium electrolytic capacitors according to claim 10, wherein an amount of electric etching in said nitric acid or said sulfuric acid is 20 to 60% of a total amount of dissolution by etching.

12. A method of manufacturing electrode foil for aluminium electrolytic capacitors according to claim 2, wherein said nitric acid or said sulfuric acid has a liquid temperature of 50° to 80° C.

13. A method of manufacturing electrode foil for aluminium electrolytic capacitors according to claim 12, wherein an amount of electric etching in said nitric acid or said sulfuric acid is 20% to 60% of a total amount of dissolution by etching.

14. A method of manufacturing electrode foil for aluminium electrolytic capacitors according to claim 12, wherein said nitric acid or said sulfuric acid has a liquid temperature of 60° to 70° C.

15. A method of manufacturing electrode foil for aluminium electrolytic capacitors according to claim 14, wherein an amount of electric etching in said nitric acid or said sulfuric acid is 20 to 60% of a total amount of dissolution by etching.

16. A method of manufacturing electrode foil for aluminium electrolytic capacitors according to claim 2, wherein an amount of electric etching in said nitric acid or said sulfuric acid is 20 to 60% of a total amount of dissolution by etching.

17. A method of manufacturing electrode foil for aluminium electrolytic capacitors according to claim 2, wherein said added concentration of said additive is 0.2 to 0.4%.

18. A method of manufacturing electrode foil for aluminium electrolytic capacitors according to claim 17, wherein an amount of electric etching in said nitric acid or said sulfuric acid is 20 to 60% of a total amount of dissolution by etching.

19. A method of manufacturing electrode foil for aluminium electrolytic capacitors according to claim 1, wherein said nitric acid or said sulfuric acid has a concentration of 2 to 15%.

20. A method of manufacturing electrode foil for aluminium electrolytic capacitors according to claim 19, wherein said nitric acid or said sulfuric acid has a liquid temperature of 50° to 80° C.

21. A method of manufacturing electrode foil for aluminium electrolytic capacitors according to claim 20, wherein an amount of electric etching in said nitric acid or said sulfuric acid is 20 to 60% of a total amount of dissolution by etching.

22. A method of manufacturing electrode foil for aluminium electrolytic capacitors according to claim 20, wherein said nitric acid or said sulfuric acid has a liquid temperature of 60° to 70° C.

23. A method of manufacturing electrode foil for aluminium electrolytic capacitors according to claim 22, wherein an amount of electric etching in said nitric acid or said sulfuric acid is 20 to 60% of a total amount of dissolution by etching.

24. A method of manufacturing electrode foil for aluminium electrolytic capacitors according to claim 19, wherein an amount of electric etching in said nitric acid or said sulfuric acid is 20 to 60% of a total amount of dissolution by etching.

25. A method of manufacturing electrode foil for aluminium electrolytic capacitors according to claim 19, wherein said nitric acid or said sulfuric acid has a concentration of 5 to 10%.

26. A method of manufacturing electrode foil for aluminium electrolytic capacitors according to claim 25, wherein an amount of electric etching in said nitric acid or said sulfuric acid is 20 to 60% of a total amount of dissolution by etching.

27. A method of manufacturing electrode foil for aluminium electrolytic capacitors according to claim 1, wherein said nitric acid or said sulfuric acid has a liquid temperature of 50° to 80° C.

28. A method of manufacturing electrode foil for aluminium electrolytic capacitors according to claim 27, wherein an amount of electric etching in said nitric acid or said sulfuric acid is 20 to 60% of a total amount of dissolution by etching.

29. A method of manufacturing electrode foil for aluminium electrolytic capacitors according to claim 27, wherein said nitric acid or said sulfuric acid has a liquid temperature of 60° to 70° C.

30. A method of manufacturing electrode foil for aluminium electrolytic capacitors according to claim 29, wherein an amount of electric etching in said nitric acid or said sulfuric acid is 20 to 60% of a total amount of dissolution by etching.

31. A method of manufacturing electrode foil for aluminium electrolytic capacitors according to claim 1, wherein an amount of electric etching in said nitric acid or said sulfuric acid is 20 to 60% of a total amount of dissolution by etching.

* * * * *